United States Patent [19]
Eichler

[11] 3,963,279
[45] June 15, 1976

[54] MOVABLE GUIDE BAR

[75] Inventor: Clifton Joe Eichler, Aransas Pass, Tex.

[73] Assignee: Loyd W. Richardson Construction Company, Aransas Pass, Tex.

[22] Filed: Aug. 14, 1975

[21] Appl. No.: 604,537

[52] U.S. Cl. ................................. 308/3 R; 83/438
[51] Int. Cl.² ....................................... F16C 17/00
[58] Field of Search ............ 83/471, 829, 162, 438; 308/3 R, 3 A

[56] References Cited
UNITED STATES PATENTS
2,771,103  11/1956  Odlum et al. .......................... 83/438
2,806,493  9/1957  Gaskell .................................. 83/438

*Primary Examiner*—M. H. Wood, Jr.
*Assistant Examiner*—Gene A. Church
*Attorney, Agent, or Firm*—Stewart N. Rice

[57] ABSTRACT

A movable guide bar, such as a rip guide for a table saw, for use transversely of a table top, which rip guide may be easily relocated from one position to another. The guide bar has a clamping mechanism containing opposing notches which will grip the bottom edges of the sides of the table top, the notches being moved into gripping position by cam means.

5 Claims, 6 Drawing Figures

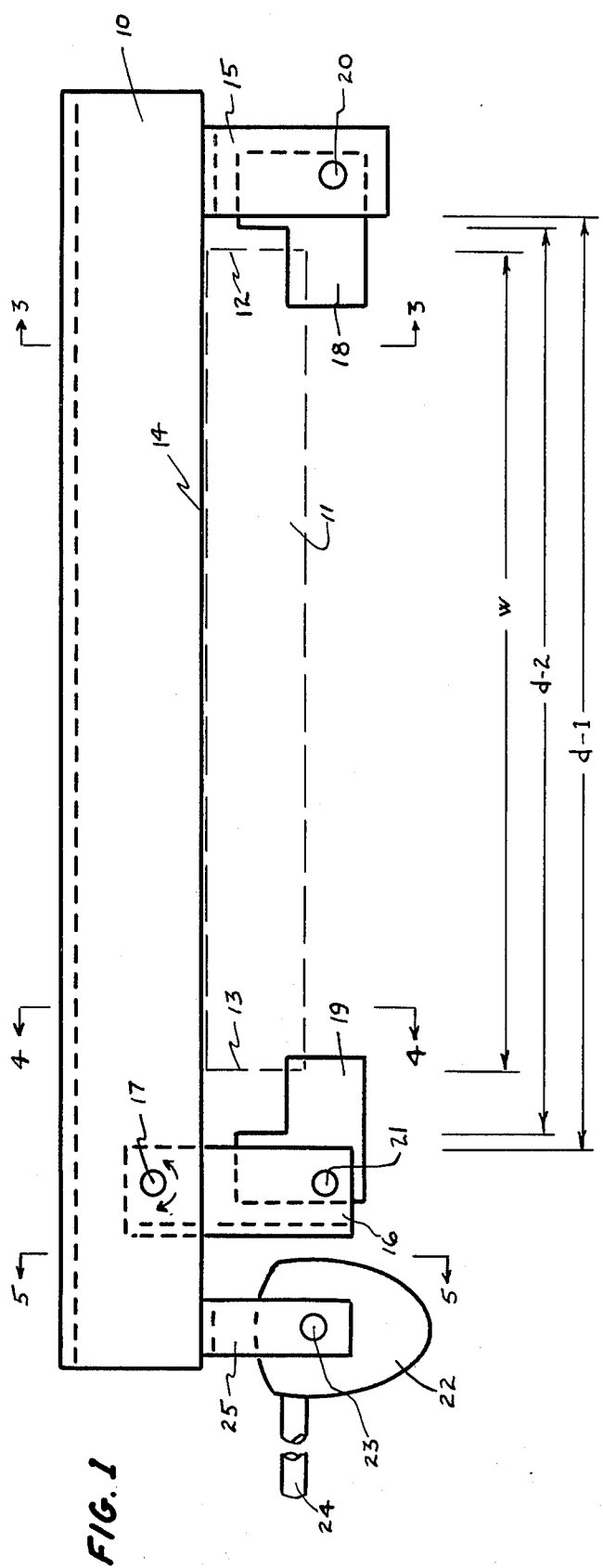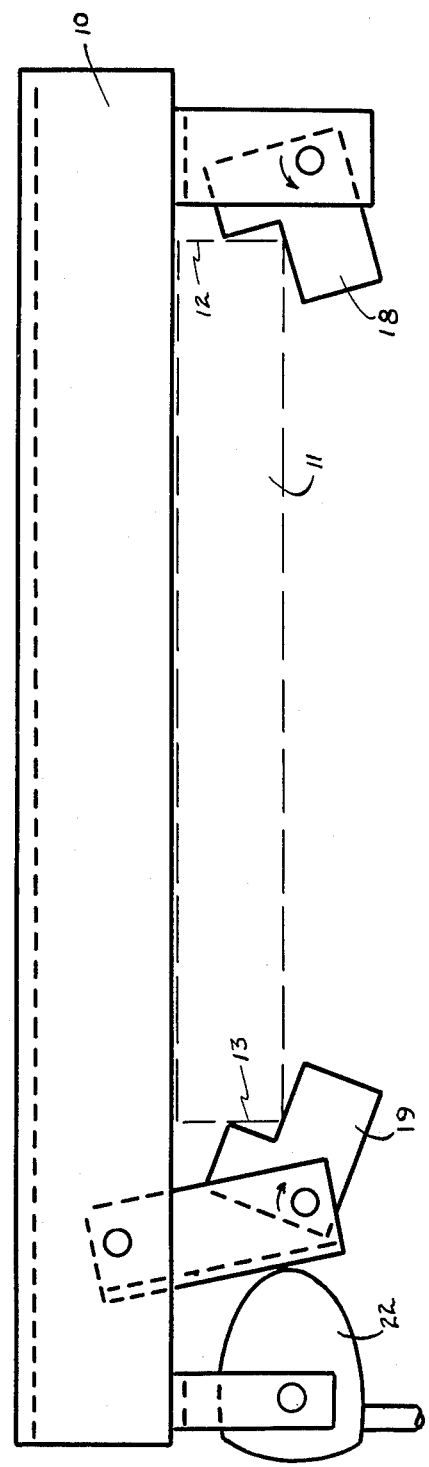

MOVABLE GUIDE BAR

BACKGROUND OF THE INVENTION

The present invention relates to a movable guide bar for use transversely of a table top, such being especially useful as a rip guide for a table saw. It is presently known to use a rip guide in connection with a table saw so that accurate cuts of lumber, sheets of plywood and the like may be made. These rip guides generally comprise a transverse bar which is parallel to the plane of the saw blade, which bar may be moved while remaining parallel to the plane of the saw blade from one position to another and then locked into position the desired distance from the saw blade. An article to be ripped may then be passed across the table top while engaged with the rip guide such that a cut will be made in the article which is parallel to the rip guide.

Many table saws come from the manufacturer with a built-in rip guide, the width of a rip using such a rip guide is however limited to the size of the saw table. It is also known to add an adjacent table which is the same height as the saw table, and to add a rip guide to the adjacent table in order to accommodate large articles to be cut. However, at the present time no one has provided a movable rip guide which is economical of manufacture yet which can readily be moved from one position to another and tightly clamped into position against movement by an article engaged therewith which is being moved across the table. For example a bar provided with thumb screws or C-clamps on each end thereof can be moved from one position to another and clamped in the desired position; however, it has been found that such is relatively cumbersome as it requires the operator to go from one side of the table to another in order to loosen or tighten the screws or clamps which are located at each end of the bar. Further, it has been found that thumb screws and C-clamps do not, at least when hand tightened, really provide adequate holding power against a sideways directed force as encountered when an article being ripped is pushed against a rip guide.

It is thus an object of the present invention to provide a new and useful movable guide bar which may readily be moved from one position to another on a table top and easily clamped into position and easily unclamped for moving to a new position. It is a particular object of the present invention to provide a movable guide bar which is useful as a rip guide for table saws. It is a further object of the present invention to provide a movable guide bar for table tops which may be clamped and unclamped without the necessity of the operator's moving from one end of the guide bar to the other.

SUMMARY OF THE INVENTION

These and other objects are accomplished by the present invention which in one of its aspects is a movable guide for use on a table top having a flat top surface and having sides which are parallel one to the other and each of which sides overhang the means supporting said table top, the perpendicular distance between said side edges being the width of said table top, said guide comprising:

a straight, horizontally disposed rail member adapted to lie flat on a said flat top surface of said table top transversely of the parallel sides of said table top, the length of said rail member being greater than width of said table top, the horizontally disposed bottom edge of said rail member being flat so as to rest on said table top, at least one side edge of said rail member being a flat, vertical, planar guide surface such that articles engaged therewith which are passed across said table top will be guided to travel in a direction perpendicular to the sides of said table top;

said rail member having a downwardly extending, fixedly attached vertical member adjacent one end thereof and a downwardly extending, pivotally attached vertical member adjacent the opposite end thereof, the distance between such vertical members, when the pivotally attached vertical member is in a vertical position, being greater than the width of said table top;

each of said vertical members having pivotally attached thereto and located below the bottom edge of said rail member a gripping member having a notch therein for gripping the bottom edge of the adjacent overhanging side of said table top, the edges of each said notch being substantially perpendicular to each other so as to form an inside corner angle of about 90° therebetween, the length of each edge of a said notch being from about ¼ to 7/8 times the thickness of the overhanging portion of said table top, the two gripping members being so pivotally attached that their respective notches may be rotated to face inwardly so as to oppose each other;

each said gripping member being pivotally attached to its respective vertical member and each said vertical member being attached to said rail member such that when the notch of each said gripping member is facing inwardly toward the adjacent overhanging side of said table top with one edge of the notch therein vertically disposed and the other edge of the notch therein horizontally disposed and extending inwardly from the lower end of the vertically disposed edge toward the adjacent overhanging side of said table top, and when the pivotally attached vertical member is in a vertical position, the perpendicular distance from the said horizontally disposed edge of the notch therein to the bottom edge of said rail member will be slightly less than the thickness of the adjacent overhanging side of said table top, with the point of pivotal attachment of each said gripping member being on an imaginary line extending downwardly and outwardly of the inside corner of the notch therein, and the distance between the vertically disposed edges of the two notches will be slightly greater than the width of said table top;

rotatable cam means attached to and below the bottom edge of said rail member for engagement with the outer edge of said pivotally attached vertical member, said rotatable cam means being located outwardly of said pivotally attached vertical member and in such proximity thereto that rotation of said cam means will cause the lobe of said cam means to engage the outer edge of said pivotally attached vertical member and force said pivotally attached vertical member inwardly toward the side edge of said table top adjacent thereto a sufficient distance to cause the opposite sides of said table top to be gripped firmly by and between said gripping members.

BRIEF DESCRIPTION OF THE FIGURES

FIG. 1 is a side view of a guide bar constructed in accordance with the present invention.

FIG. 2 is a side view of the guide bar of FIG. 1 in a clamping position on a table top.

DETAILED DESCRIPTION OF THE INVENTION

Figure 3:
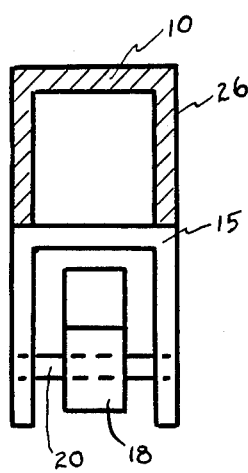
FIG. 3 is a sectional view along line 3—3 of FIG. 1.

Referring to the drawings, there is illustrated in FIG. 1 a movable guide bar constructed in accordance with the present invention which may easily be clamped into a desired position and then easily unclamped and moved to a new position. The guide bar consists of a horizontally disposed rail member 10 which is adapted for use on a flat table top (a table top 11 being illustrated in dashed lines) having substantially parallel sides which overhang the members supporting the table top (supporting members not shown). The parallel sides of table top 11 are indicated by the numerals 12 and 13, the perpendicular distance between the sides being referred to as the width of the table as indicated by distance $w$ in FIG. 1. It is pointed out that in FIG. 1, the outline of a table top 11 is merely superimposed for illustrative purposes in order to show the relative sizes of the various components since the gripping members hereafter described could not actually occupy the position shown in FIG. 1 if the guide bar were actually positioned on table top 11.

Figure 4:
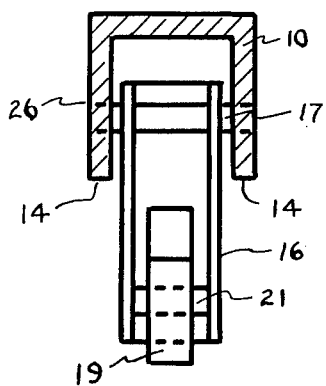
FIG. 4 is a sectional view along lines 4—4 of FIG. 1 except that the cam means apparatus is not illustrated.

Rail member 10 must have a horizontally disposed bottom edge 14 which will lie flat on a table top and rail member 10 may, for example, be an inverted length of aluminum channel stock as shown in the drawings. The bottom edge 14 of the rail member then actually is composed of two strips of metal; see FIG. 4. As illustrated in FIGS. 1 and 2, the length of the rail member must be greater than the width $w$ of table top 11 so as to accommodate the attachment of other components thereto as hereinafter described. Attached adjacent one end of rail member 10 and adapted to be located outwardly of side 12 of the table top is a vertical member 15 which is fixedly attached to and extends downwardly from rail member 10. As may be seen in FIG. 3, vertical member 15 may be a forked piece of metal with the forks facing downwardly, for example an inverted piece of channel stock which is welded to the underside of rail member 10.

Adjacent the opposite end of rail member 10 and adapted to be located outwardly of side 13 of a table top is vertical member 16 which is pivotally attached to rail member 10 by pin 17 such that vertical member 16 may swing from the vertical position shown in FIG. 1 inwardly toward the table top or outwardly away from the table top as indicated by the arrows adjacent pin 17. The distance between vertical member 15 and vertical member 16, measured when the pivotally attached vertical member 16 is in a vertical position as shown in FIG. 1, such distance being indicated as distance $d$-1 in FIG. 1, must be greater than the width $w$ of table top 11. Pivotally attached vertical member 16 may for example be a short length of channel stock which is narrower than the channel in rail member 10, with the channel portion of vertical member 16 facing inwardly toward side 13 of table top 11. If desired, fixedly attached vertical member 15 may also be constructed of a narrow piece of channel stock welded to rail member 10 with the channel facing inwardly toward table side 12 instead of downwardly as shown in FIG. 1.

Pivotally attached to each of vertical members 15 and 16, and located below the bottom edge of rail member 10, are gripping members 18 and 19 having a more or less L-shaped notches therein. These notches are for the purpose of gripping the bottom edge of table top 10 adjacent each notch as illustrated in FIG. 2. Gripping member 18 is pivotally attached by pin 20 and gripping member 19 is pivotally attached by pin 21 such that each gripping member may rotate or pivot about such pins.

Figure 6:
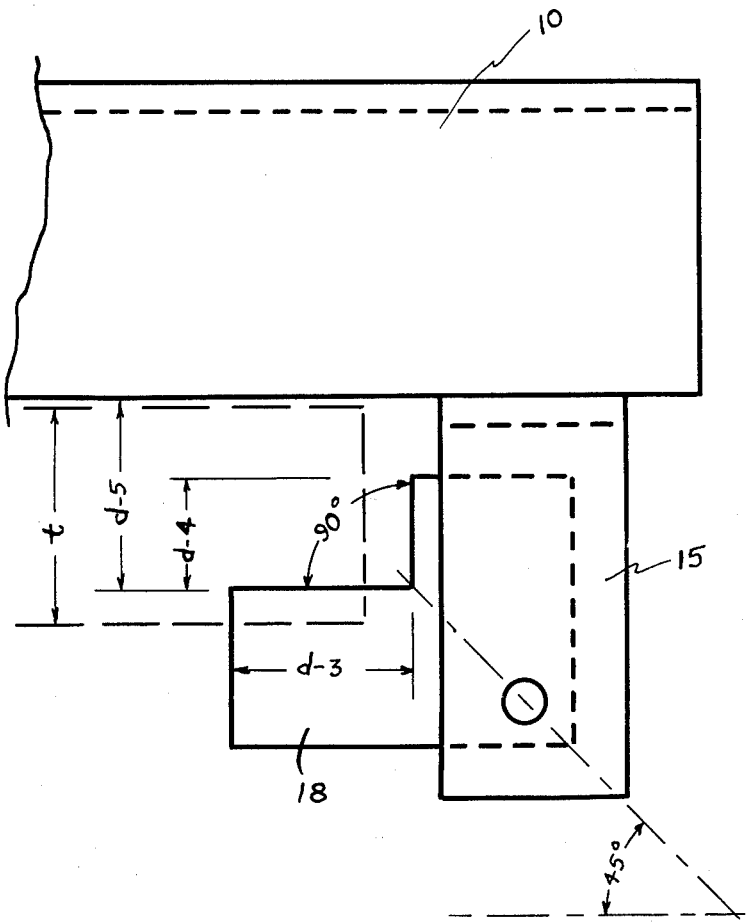
FIG. 6 is an enlarged side view of the portion of the guide bar of FIG. 1 illustrated in FIG. 3.

The notches in each of the gripping members 18 and 19 must be such that the two edges of a notch are substantially perpendicular to each other so as to form an angle of about 90° therebetween. In the drawings the entire gripping member itself is L-shaped but it is only necessary that the notch therein be more or less L-shaped; for example the gripping member could be a circular disk with an L-shaped notch therein. The length of each edge of a notch, that is distances indicated as $d$-3 and $d$-4 on FIG. 6 should be from about one-fourth to seven-eighths times, preferably from about one-third to two-thirds times, the thickness of the table top on which the guide bar is to be used. Thus on a one inch thick table top, each of distances $d$-3 and $d$-4 would preferably be from one-third to two-thirds inches in length. It is not necessary that the edges of a notch be equal in length.

As may be seen from FIGS. 1 and 2, the two notches must be opposing each other, that is facing inwardly toward the edge of the side of the table adjacent the respective gripping members. Further, in order to grip the adjacent bottom edge of the side of table 11, each notch must be such that one edge thereof may be vertically disposed and the other edge horizontally disposed and extending inwardly from this junction with the vertically disposed edge (i.e., the inside corner of the notch) toward the side of the table top adjacent the particular notch. Further, in order to work properly, the point of pivotal attachment of a gripping member to its respective vertical member must be, as measured when one edge of the notch is vertical and one edge horizontal as shown in the drawings, on an imaginary line extending downwardly and outwardly (preferably about 45° downwardly and outwardly such that such imaginary line will bisect the notch angle) of the inside corner of the notch; see FIG. 6. Preferably the distance from the point of pivotal attachment to the inside corner of the notch is from about 10 to 100 percent, preferably 15 to 50 percent, of the thickness of the table top.

The attachment of vertical members 15 and 16 to rail member 10 and the attachment of gripping members 18 and 19 also bear a critical relationship to the width and thickness of table top 11. In order to function as intended, when measured with pivotally attached vertical member 16 in a vertical position and each gripping member in the position illustrated in FIG. 1 with one edge of a notch vertically disposed and one edge horizontally disposed and extending inwardly toward the adjacent side of table top 11; (1) the distance from the bottom edge 14 of rail member 10 to the horizontally disposed edge of a notch (distance $d$-5 in FIG. 6) must be slightly less than the thickness $t$ of the table top, distance $d$-5 generally being from about 80 to 98 percent, preferably 90 to 97 percent, of thickness $t$; (2) the distance between opposing vertically disposed edges of notches 18 and 19 shown as distance $d$-2 on FIG. 1 must be slightly greater than the width $w$ of the table top, $d$-2 generally being greater than $w$ by a distance of from about 8 to 100 percent, preferably about 10 to 50 percent, of the thickness $t$ of the table top; and (3) the distance between vertical members indicated as distance $d$-1 must be slightly greater than the width of the table top and at least about as great as the distance $d$-2 between opposing vertical faces of the notches. Of course the maximum distance is that $d$-1 and $d$-2 may assume will vary according to the length of the edges of the notches and other factors, since if the notches are too far apart the table top can not be gripped therebetween in the manner hereinafter explained.

Also attached to rail member 10 and located outwardly of pivotally attached vertical member 16 is a cam 22 which is rotatable about pin 23 by moving handle 24 which is firmly attached to cam 22. Cam 22 is suspended within the downwardly extending forks of a bracket 25 which is firmly attached to rail member 10 as by welding. In using the guide bar of FIG. 1 as a rip guide for a table saw, it is placed transversely of a table top 11 which table top extends away from the plane of a saw blade, rail member 10 being parallel to the plane of a saw blade. In order to properly align the rail the proper distance from the saw blade and parallel thereto, a pair of rules or other measuring scales may be inset in the table top, the rules being parallel to each other and extending perpendicularly away from the plane of the saw blade.

When it is desired to move rail member 10 along the table top, pivotally attached vertical member 16 may be pivoted outwardly away from table side 13 and then, when rail member 10 is in the desired position, can be clamped firmly into position by pushing downwardly on handle 24. By pushing downwardly on handle 24 the lobe of cam 22 is rotated into contact with the outer edge of vertical member 16 and forces vertical member 16 to swing inwardly toward the table top such that the table top is squeezed between gripping members 18 and 19 as illustrated in FIG. 2. With cam 22 properly designed and located the proper distance from vertical member 16, the friction or pressure of cam 22 against vertical member 16 will hold the cam in the desired position without the necessity of continuing pressure being applied downwardly on the handle by the operator. The operator can thus release his grip on handle 24 and do the desired cutting or ripping operation. When the operator is ready to move the guide bar to a new position, it may easily be loosened by pulling upward on handle 24 allowing vertical member 16 and gripping member 19 to swing away from the table top.

The unique gripping action of the present invention is very powerful as it both pulls rail member 10 downward against the table top and also effects a squeezing type of action on the sides of the table. Since the thickness $t$ of the table top is greater than the distance $d$-5, when the sides of the table top are forced against the notches, each notch will tilt inwardly as illustrated by the arrows adjacent pins 20 and 21 in FIG. 2. The bottom corner of the table edge will thus rest on the more or less horizontally disposed edge of a notch, and will, as more pressure is provided by moving vertical member 16 inwardly, act to pull rail member downwardly against the upper surface of the table top. Also at the same time, the upper end of the more or less vertically disposed edges of the notch will come into contact with the sides 12 and 13 of the table top and exert a squeezing effect on the sides of the table top.

To illustrate a specific example, a guide bar was constructed in accordance with FIG. 1 for use on a table top with a width $w$ of 27 inches and a thickness $t$ of ¾ inch. The distance $d$-4 from the bottom edge of rail member 10 to the horizontally disposed edge of each notch was 11/16 inch. The edges of each notch, distances $d$-3 and $d$-4, were about ½ inch in length. The distance $d$-2 between opposing vertical edges of the notches was 27⅛ inches and the distance $d$-1 between vertical members was about 27¼ inches. The center of the point of pivotal attachment of each gripping member to its respective vertical member was on a line extending downwardly and outwardly 45° from the inside corner of the notch and about ¼ inch from the corner of the notch.

Figure 5:
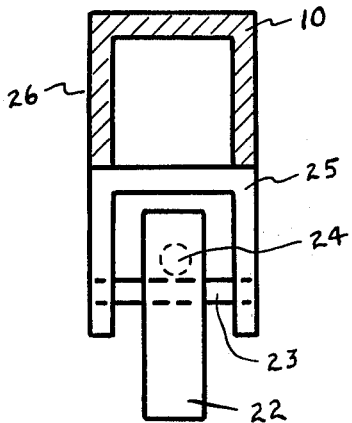
FIG. 5 is a sectional view along lines 5—5 of FIG. 1 and illustrates more specifically the cam means apparatus of the guide bar of FIG. 1.

At least one side edge, for example edge 26 (see FIGS. 3, 4 and 5), must be a flat, vertical planar guide surface so that articles to be ripped will slide easily along such surface. Such guide surface is the surface which serves to guide the article to be ripped and thus cannot have any projections which would snag or halt the movement of an article being passed across the table which was sliding against such surface. In the apparatus illustrated either edge 26 of rail member 10 or the opposite edge would serve as a guide surface since pin 17 is flush with both side edges of rail member 10. Thus if a bolt were used in lieu of pin 17, the head of the bolt would needed to be countersunk into edge 26 to be flush or below the surface although the threaded end of the bolt and nut to be placed thereon could extend beyond the opposite edge if desired.

The embodiments of the invention in which an exclusive property or privilege is claimed are defined as follows:

1. A movable guide for use on a table top having a flat top surface and having sides which are parallel one to the other and each of which sides overhang the means supporting said table top, the perpendicular distance between said side edges being the width of said table top, said guide comprising:

a straight, horizontally disposed rail member adapted to lie flat on a said flat top surface of said table top transversely of the parallel sides of said table top, the length of said rail member being greater than width of said table top, the horizontally disposed bottom edge of said rail member being flat so as to rest on said table top, at least one side edge of said rail member being a flat, vertical, planar guide surface such that articles engaged therewith which are passed across said table top will be guided to travel in a direction perpendicular to the sides of said table top;

said rail member having a downwardly extending, fixedly attached vertical member adjacent one end thereof and a downwardly extending, pivotally attached vertical member adjacent the opposite end thereof, the distance between such vertical members, when the pivotally attached vertical member is in a vertical position, being greater than the width of said table top;

each of said vertical members having pivotally attached thereto and located below the bottom edge of said rail member a gripping member having a notch therein for gripping the bottom edge of the adjacent overhanging side of said table top, the edges of each said notch being substantially perpendicular to each other so as to form an inside corner angle of about 90° therebetween, the length of each edge of a said notch being from about one-fourth to seven-eighths times the thickness of the overhanging portion of said table top, the two gripping members being so pivotally attached that their respective notches may be rotated to face inwardly so as to oppose each other;

each said gripping member being pivotally attached to its respective vertical member and each said vertical member being attached to said rail member such that when the notch of each said gripping member is facing inwardly toward the adjacent overhanging side of said table top with one edge of the notch therein vertically disposed and the other edge of the notch therein horizontally disposed and extending inwardly from the lower end of said vertically disposed edge toward the adjacent overhanging side of said table top, and when the pivotally attached vertical member is in a vertical position, the perpendicular distance from the said horizontally disposed edge of the notch therein to the bottom edge of said rail member will be slightly less than the thickness of the adjacent overhanging side of said table top, with the point of pivotal attachment of each said gripping member being on an imaginary line extending downwardly and outwardly of the inside corner of the notch therein, and the distance between the vertically disposed edges of the two notches will be slightly greater than the width of said table top;

rotatable cam means attached to and below the bottom edge of said rail member for engagement with the outer edge of said pivotally attached vertical member, said rotatable cam means being located outwardly of said pivotally attached vertical member and in such proximity thereto that rotation of said cam means will cause the lobe of said cam means to engage the outer edge of said pivotally attached vertical member and force said pivotally attached vertical member inwardly toward the side edge of said table top adjacent thereto a sufficient distance to cause the opposite sides of said table top to be gripped firmly by and between said gripping members.

2. The guide of claim 1 wherein said perpendicular distance from the said horizontally disposed edge of a notch to the bottom edge of said rail member is from about 80 to 98 percent of said thickness of the overhanging side of said table top; wherein said distance between the vertically disposed edges of the two notches is greater than the said width of said table top by an amount which is from about 8 to 100 percent of the said thickness of the overhanging side of said table top; wherein the said thickness between such vertical members is at least about as great as the said distance between the vertically disposed edges of the two notches; and wherein the said point of pivotal attachment of each said gripping member is a distance from the inside corner of the notch therein which is from about 10 to 100 percent of the said thickness of the overhanging side of said table top.

3. The guide of claim 1 wherein said perpendicular distance from the said horizontally disposed edge of a notch to the bottom edge of said rail member is from about 90 to 97 percent of said thickness of the overhanging side of said table top; wherein said distance between the vertically disposed edges of the two notches is greater than the said width of said table top by an amount which is from about 10 to 50 percent of the said thickness of the overhanging side of said table top; wherein the said distance between such vertical members is at least about as great as the said distance between the vertically disposed edges of the two notches; and wherein the said point of pivotal attachment of each said gripping member is a distance from the inside corner of the notch therein which is from about 15 to 50 percent of the said thickness of the overhanging side of said table top.

4. The guide of claim 2 wherein said point of pivotal attachment of each said gripping member is on an imaginary line extending approximately 45° downwardly and outwardly of the inside corner of the notch therein.

5. The guide of claim 3 wherein said point of pivotal attachment of each said gripping member is on an imaginary line extending approximately 45° downwardly and outwardly of the inside corner of the notch therein.

* * * * *